April 10, 1951 R. B. MOIR ET AL 2,548,805
CASING STRUCTURE FOR REDUCTION DRIVE UNITS
Filed Aug. 16, 1946 3 Sheets-Sheet 1
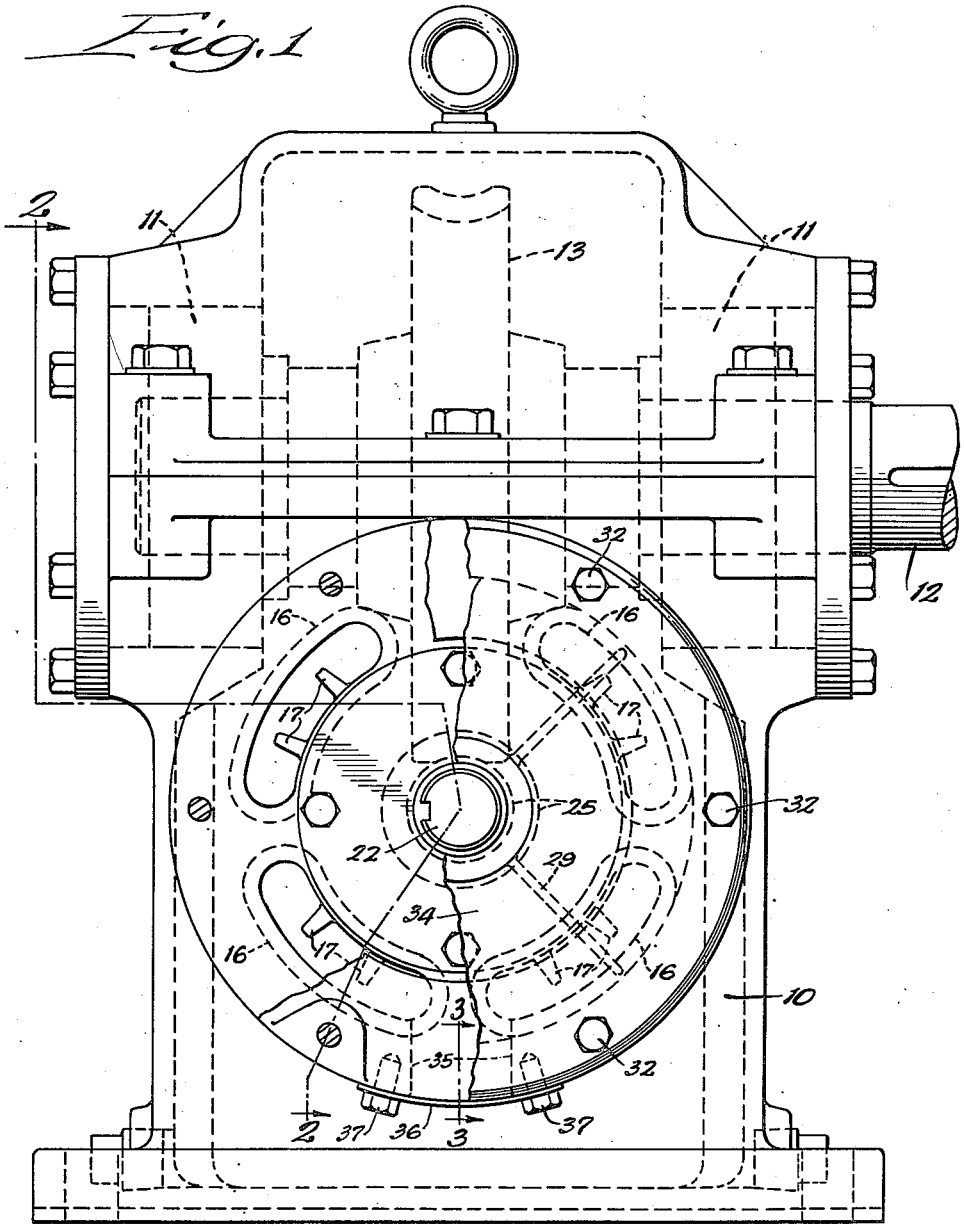

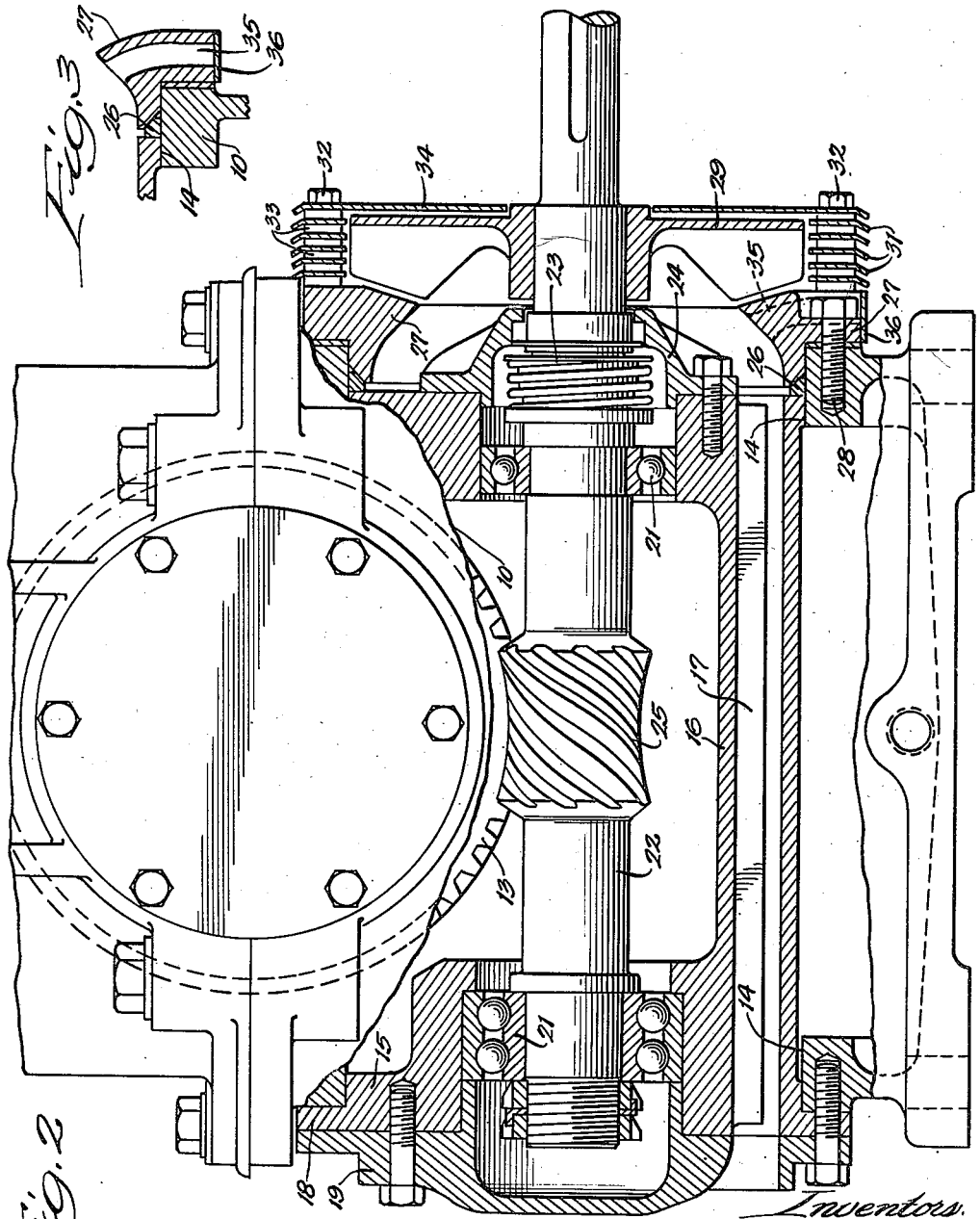

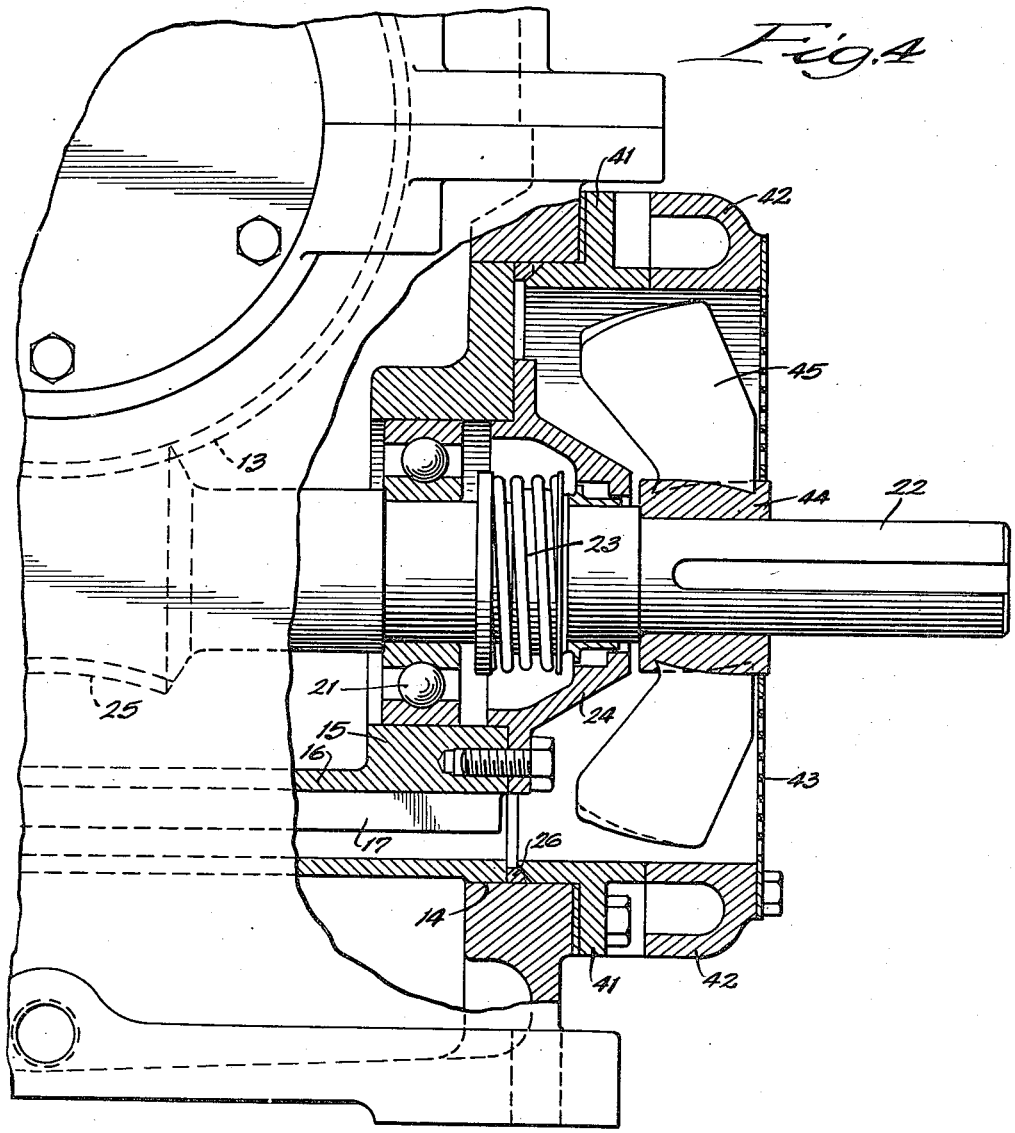

Patented Apr. 10, 1951

2,548,805

UNITED STATES PATENT OFFICE 2,548,805

CASING STRUCTURE FOR REDUCTION DRIVE UNITS

Robert B. Moir and Ole I. Stangeland, Chicago, Ill., assignors to Foote Bros. Gear and Machine Corporation, Chicago, Ill., a corporation of Delaware Application August 16, 1946, Serial No. 691,127

12 Claims. (Cl. 74—606)

This invention relates to reduction drive units and more particularly to worm type units which are cooled to increase their capacity.

One of the objects of the invention is to provide a reduction drive unit in which the worm shaft is carried by a support mounted bodily in the housing of the unit. With this construction, the support and worm shaft can be bench-assembled and mounted complete in the housing as a sub-assembly.

Another object is to provide a reduction drive unit in which a support is integrally formed as by casting with ends to be mounted in openings in the housing connected by tubes which form passages for cooling fluid. The tubes are preferably flattened and arcuately curved in section to increase the strength of the support and to provide maximum cooling area.

Still another object is to provide a reduction drive unit in which the support is sealed in the housing upon assembly against leakage of lubricant.

A further object is to provide a reduction drive unit in which the cooling passages can easily be cleaned without requiring disassembly.

A still further object is to provide a reduction drive unit having a simple and inexpensive fan or blower casing which can easily be assembled on the unit housing.

The above and other objects and advantages of the invention will be more readily apparent from the following description when read in connection with the accompanying drawings, in which—

Figure 1 is an end elevation with parts broken away of a reduction drive unit embodying our invention;

Figure 2 is a section on the line 2—2 of Figure 1 with parts in elevation.

Figure 3 is a partial detailed section on the line 3—3 of Figure 1; and

Figure 4 is a partial section similar to Figure 2 of an alternative construction.

The unit as illustrated comprises a main housing or casing 10 of the desired size and shape to house the gears and which is adapted to contain in its lower portion a body of lubricant to lubricate the gears. The housing is formed in its upper part with aligned bores to receive bearings 11 in which a worm gear shaft 12 is journaled. The shaft 12 carries a worm gear 13 forming the output gear of the unit. While the unit has been shown with the input and output shafts horizontal and output shaft above the input shaft, it will be understood that the unit could be mounted in any desired position with the shafts either horizontal or vertical as desired.

In its lower portion, the casing 10 is formed with aligned cylindrical bores 14 at its opposite sides to receive a support carrying the input shaft. The support may comprise a unitary casting having cylindrical end portions 15 to seat in the bores 14 and connected by integral tubes 16. As best seen in Figure 1, the tubes 16 are flattened in section and are arcuately curved so that they lie in annular array around the central axis of the support with a gap between the upper tubes through which the edge of the worm gear 13 may extend. The tubes are preferably formed with relatively thin walls to provide maximum heat transfer and may have integral ribs 17 formed therein to strengthen the construction and to increase the heat transfer area.

The support may be mounted in the bores 14 as shown and may be secured in place by a flange 18 at one of the ends which overlies and is bolted to the housing. A cap 19 is secured over the flange 18 to close the adjacent end of the support and is formed with openings therein registering with the tubes 16 so that air or other cooling fluid may circulate through the tubes.

The ends 15 of the support are formed with central bores to carry bearings 21 in which a worm shaft 22 is journaled. The bearing 21 at one end is closed by the cap 19 and at the opposite end may be closed by a seal indicated generally at 23 which seats against a cap 24 secured to the other end of the support. The shaft 22 may project beyond the last named end of the support for connection to a driving motor or the like. In its central part, the shaft 22 is formed with worm teeth 25 to mesh with the worm gear 13.

With the construction as so far described, the entire support and worm shaft assembly can be assembled in a bench operation before the support is mounted in the housing. This greatly facilitates the manufacture of the units and enables the sub-assemblies to be stocked, if desired, for completion in the housing to meet required specifications. When the support assembly is mounted in the housing, the worm shaft is accurately centered by engagement of the cylindrical ends 15 with the bores 14 in the housing and its axial location may be determined by shimming between the flange 18 and the adjacent end of the body when required. The flange 18 provides a good oil seal at one end of the body and the opposite end of the support may be sealed by a resilient sealing ring 26 fitting in the bore 14 against the end of the support. The ring 26 may be compressed by a ring 27 secured to the end of the housing by screws 28 and which is formed with its inside circular opening registering with the tubes 16.

For circulating air through the tubes 16 to cool the unit, a fan or blower may be provided carried by the worm shaft 22. As shown, a blower rotor 29, having radial blades carried by a circular disc, is mounted on the shaft 22 adjacent to the ring 27. The passages in the ring 27 may be shaped, as illustrated, to direct air into the central part of the blower blades so that the air will be forced radially outward by the blades.

The blower rotor is enclosed by a housing formed of a series of annular rings 31 which may be stamped from sheet metal and which are assembled on screws 32 threaded into the ring 27 with spaced collars 33 between them. The outer end of the blower housing may be closed by a sheet metal disc 34 assembled with the rings.

In order that cooling passages through the tubes 16 can easily be cleaned to maintain maximum cooling efficiency, the ring 27 is formed at its lower central part with a clean-out passage 35, as best seen in Figure 3. The outer end of the clean-out passage is normally closed by a closure strip 36 secured to the ring 27 by screws 37. To clean out the tubes, a brush may be run through them from left to right as seen in Figure 2 to dislodge dust and like foreign materials accumulating in the tubes and force it toward the ring 27. If the cleaning operation is performed with the blower running, some of the dust and dirt will be drawn into the blower and forced out by its action while the remainder of the dust and dirt will fall into the clean-out passage 35 from which it can easily be removed by loosening the cover strip 36. In this way the cooling passages may be maintained clean at all times without requiring disassembly or even shut down of the unit.

Instead of a blower as described above, a fan may be used to circulate air through the tubes as shown in Figure 4. In this construction an annular ring 41 having an inner cylindrical surface replaces the ring 27 of Figures 1 to 3 and serves to compress the seal ring 26 against the end 15 of the support. A second ring 42 having an inner cylindrical surface is fastened to the ring 41 and carries an end screen 43 through which the shaft 22 extends.

The rings 41 and 42 and the screen 43 form a housing for a fan having a hub 44 secured to the shaft 22 and a series of blades 45 carried by the hub. The blades 45 create an axial flow of air through the tubes and the screen 43 to cool the unit. Air flow may be in either direction as desired.

In both of the constructions shown circulation of air through the tubes cools the lubricant in the casing to increase the capacity of the reduction units. At the same time the outer wall of the casing or housing is unobstructed and serves as a heat radiating surface in contact with the hot lubricant on one side and fully exposed to air on the other to assist in the cooling. In certain installations where maximum cooling is not required the tubes may be omitted and in these instances separate bearing rings may be detachably secured in the bores 14 in the housing, the remainder of the structure except for omission of the fan being the same.

While two embodiments of the invention have been shown and described in detail, it will be understood that these are illustrative only and are not to be taken as a definition of the scope of the invention, reference being had for this purpose to the appended claims.

What is claimed is:

1. A reduction drive unit comprising a hollow housing forming with aligned openings therein, an elongated support extending through the housing and fitting in said openings, a worm shaft extending through the support, bearings in the support rotatably mounting the worm shaft therein, the support having a plurality of tubular passages therethrough in partial annular array around the worm shaft, and opening to the exterior of the casing at their ends, and a gear rotatably mounted in the housing meshing with the worm shaft.

2. A reduction drive unit comprising a hollow housing formed with aligned openings therein, a support including end members to fit in the openings and annularly arranged tubes extending between the end members, the end members having openings therein registering with the passages through the tubes, bearings in the end members, a shaft journaled in the bearings and extending through the space between the tubes, and a gear in the housing drivably connected to the shaft.

3. A reduction drive unit comprising a hollow housing formed with aligned circular openings in its opposite sides, an integral support having cylindrical ends to fit in the openings and annularly arranged tubes extending between the ends and forming passages for cooling fluid, bearings centrally carried by the ends, a worm shaft journaled in the bearings having worm teeth in its center part, and a worm gear in the housing meshing with the worm teeth.

4. A reduction drive unit comprising a hollow housing formed with aligned circular openings in its opposite sides, an integral support having cylindrical ends to fit in the openings and annularly arranged tubes extending between the ends and forming passages for cooling fluid, the tubes being flattened in section and arcuately curved around the axis of the support, bearings centrally carried by the ends, a worm shaft journaled in the bearings having worm teeth in its center part, and a worm gear in the housing meshing with the worm teeth.

5. A reduction drive unit comprising a hollow housing formed with aligned circular openings in its opposite sides, an integral support having cylindrical ends to fit in the openings and annularly arranged tubes extending between the ends and forming passages for cooling fluid opening at the ends of the support, bearings centrally carried by the ends, a worm shaft journaled in the bearings having worm teeth in its center part, a worm gear in the housing meshing with the worm teeth, and air circulating means on the worm shaft to circulate air through the passages.

6. A reduction drive unit comprising a hollow housing formed with aligned circular openings in its opposite sides, an integral support having cylindrical ends to fit in the openings and annularly arranged tubes extending between the ends and forming passages for cooling fluid opening at the ends of the support, bearings centrally carried by the ends, a worm shaft journaled in the bearings having worm teeth in its center part, a worm gear in the housing meshing with the worm teeth, a blower rotor on the worm shaft having radial blades to receive air from the passages, a series of thin annular rings around the rotor, screws securing the rings to the housing, and spacers on the screws between the rings to hold them spaced.

7. A reduction drive unit comprising a hollow housing formed with aligned circular openings in its opposite sides, an integral support having cylindrical ends to fit in the openings and annularly arranged tubes extending between the ends and forming passages for cooling fluid, a worm shaft journaled in the support having worm teeth thereon, a worm gear in the housing meshing with the worm teeth, means sealingly securing one of the support ends to the housing, an annular sealing ring fitting in one of the openings in the housing and engaging the other end of the support, and a fastening ring secured to the housing and pressing the sealing ring against said other end of the support.

8. A reduction drive unit comprising a hollow housing formed with aligned openings in its opposite sides, an integral support having ends fitting in the openings connected by tubes forming cooling fluid passages through the support, a worm shaft journaled in the support, a worm gear in the housing meshing with teeth on the worm shaft, a rotor on the worm shaft adjacent one end of the support to circulate cooling fluid through the passages, an annular ring between the rotor and the adjacent end of the support formed in its lower part with a clean out opening, and a removable closure for the clean out opening.

9. A reduction drive unit comprising a hollow housing formed with aligned openings in its opposite sides, an integral support having ends fitting in the openings connected by tubes forming cooling fluid passages through the support, a worm shaft journaled in the support, a worm gear in the housing meshing with teeth on the worm shaft, a ring secured to the housing at one end of the support and having a clean out opening in its lower part, a closure for the clean out opening detachably secured to the ring, and air circulating means on the worm shaft adjacent the ring to circulate cooling fluid through the passages and the ring.

10. In a reduction drive unit, a support assembly comprising an elongated integral body having end portions with external cylindrical surfaces connected by longitudinally extending tubes in annular array, the end portions having central bores therein, bearings in the bores, and a driving shaft journaled in the bearings and extending longitudinally through the support.

11. In a reduction drive unit, a support assembly comprising an elongated integral body having end portions with external cylindrical surfaces connected by longitudinally extending tubes in annular array, the end portions having central bores therein, bearings in the bores, and a driving shaft journaled in the bearings and extending longitudinally through the support, the tubes being flattened in cross section and arcuately curved around the axis of the shaft.

12. In a reduction drive unit, a hollow housing adapted to contain a lubricant, a support detachably mounted in the housing and including tubes extending through the housing for circulation of cooling fluid therethrough, a worm shaft journaled in the support having worm teeth thereon, and a gear in the housing meshing with worm teeth on the shaft, the lubricant in the housing contacting the tubes and the housing wall to be cooled by cooling fluid flowing through the tubes and by flow of heat through the housing wall.

ROBERT B. MOIR.
OLE I. STANGELAND.

REFERENCES CITED

The following references are of record in the file of this patent:

UNITED STATES PATENTS

| Number | Name | Date |
|---|---|---|
| 892,923 | Winans | July 7, 1908 |
| 1,508,225 | Hershberger | Sept. 9, 1924 |
| 1,916,990 | Ransome | July 4, 1933 |
| 2,113,868 | Acker | Apr. 12, 1938 |
| 2,136,254 | Sargent | Nov. 8, 1938 |
| 2,142,834 | Bergstrom | Jan. 3, 1939 |
| 2,147,391 | Acker | Feb. 14, 1939 |
| 2,388,863 | Noble | Nov. 13, 1945 |
| 2,443,075 | Locke | June 8, 1948 |

FOREIGN PATENTS

| Number | Country | Date |
|---|---|---|
| 420,927 | Great Britain | Dec. 11, 1934 |
| 476,724 | Great Britain | Apr. 1, 1938 |